(12) United States Patent
Glimpel et al.

(10) Patent No.: US 8,992,143 B2
(45) Date of Patent: Mar. 31, 2015

(54) MODULAR DRILL

(75) Inventors: Helmut Glimpel, Lauf a.d. Pegnitz (DE); Bernhard Borschert, Bamberg (DE)

(73) Assignee: EMUGE-Werk Richard Glimpel GmbH & Co. KG, Fabrik für Präzisionswerkzeuge, Lauf (DE)

( * ) Notice: Subject to any disclaimer, the term of this patent is extended or adjusted under 35 U.S.C. 154(b) by 437 days.

(21) Appl. No.: 13/256,906

(22) PCT Filed: Mar. 17, 2010

(86) PCT No.: PCT/EP2010/053485
§ 371 (c)(1),
(2), (4) Date: Sep. 26, 2011

(87) PCT Pub. No.: WO2010/106117
PCT Pub. Date: Sep. 23, 2010

(65) Prior Publication Data
US 2012/0014760 A1    Jan. 19, 2012

(30) Foreign Application Priority Data

Mar. 19, 2009 (DE) .......................... 10 2009 013 580

(51) Int. Cl.
*B23B 51/02* (2006.01)

(52) U.S. Cl.
CPC .............. *B23B 51/02* (2013.01); *B23B 2250/12* (2013.01); *B23B 2251/02* (2013.01)
USPC .......................................... 408/233; 408/226

(58) Field of Classification Search
USPC .................. 408/144, 226, 230, 231, 232, 233
See application file for complete search history.

(56) References Cited

U.S. PATENT DOCUMENTS 4,950,108 A * 8/1990 Roos ............................... 408/59
5,904,455 A   5/1999 Krenzer et al.
(Continued)

FOREIGN PATENT DOCUMENTS

CN        120497      1/1999
CN       1630569      6/2005
(Continued)

OTHER PUBLICATIONS

Full machine translation of JP 2004276134.*
(Continued)

*Primary Examiner* — Sunil K Singh
*Assistant Examiner* — Alan Snyder
(74) *Attorney, Agent, or Firm* — Workman Nydegger

(57) ABSTRACT

The invention relates to a modular drill including a shank part with an end side. A cutting part can be connected to the shank part at its end side. The shank part has at least one torque transmission element which projects on the end side and has at least one torque transmission face for transmitting a torque in the rotational direction from the shank part to the cutting part. The cutting part has at least one torque receiving region for receiving the torque. The at least one torque receiving region has at least one torque receiving face which corresponds with the torque transmission face. The cutting part has at least one centering element for radially centering the cutting part in relation to the shank part. The cutting part is clamped to the shank part via a clamping element which acts at least predominantly in the axial direction.

18 Claims, 7 Drawing Sheets

(56) References Cited

U.S. PATENT DOCUMENTS

| | | |
|---|---|---|
| 5,947,660 A | 9/1999 | Karlsson et al. |
| 5,957,631 A | 9/1999 | Hecht |
| 5,988,953 A * | 11/1999 | Berglund et al. ............ 408/1 R |
| 6,012,881 A | 1/2000 | Scheer |
| 7,625,161 B1 * | 12/2009 | Ruy Frota de Souza ..... 408/227 |
| 2002/0168239 A1 | 11/2002 | Mast |
| 2005/0135887 A1 | 6/2005 | Borschert et al. |
| 2008/0193237 A1 | 8/2008 | Men et al. |

FOREIGN PATENT DOCUMENTS

| | | |
|---|---|---|
| DE | 4435857 A1 | 4/1996 |
| DE | 69629943 | 5/2004 |
| DE | 10311508 A1 | 9/2004 |
| DE | 69825586 | 2/2005 |
| DE | 102006005880 A1 | 8/2007 |
| EP | 1990113 A1 | 11/2008 |
| GB | 1507879 | 4/1978 |
| JP | 2003326411 * | 11/2003 |
| JP | 2003326411 A * | 11/2003 |
| JP | 2004276134 * | 10/2004 |
| JP | 2004276134 A * | 10/2004 |
| JP | 2005161462 A | 6/2005 |
| WO | 03/070408 | 8/2003 |

OTHER PUBLICATIONS

Full machine translation of JP 2004276134, Oct. 2004.*
International Preliminary Report on Patentability mailed Sep. 29, 2011 for PCT/EP2010/053485.

* cited by examiner

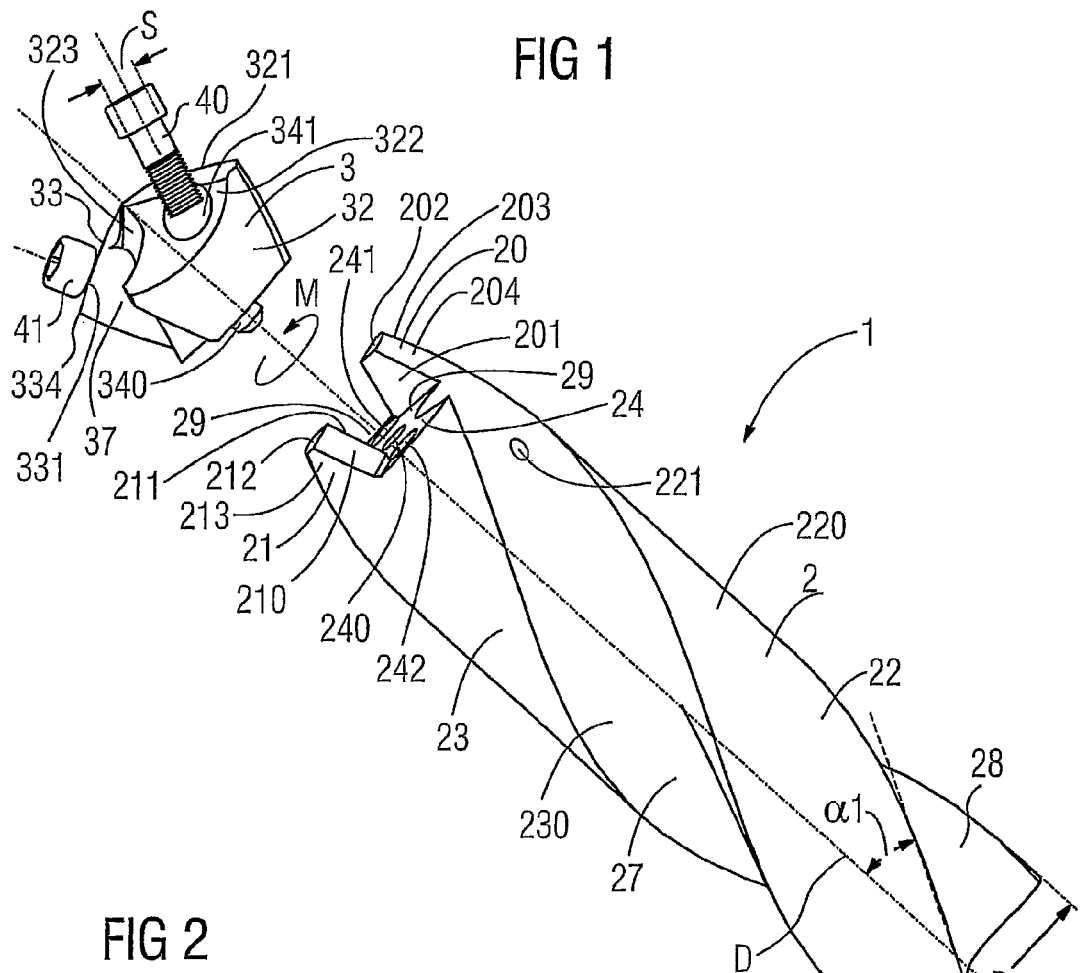
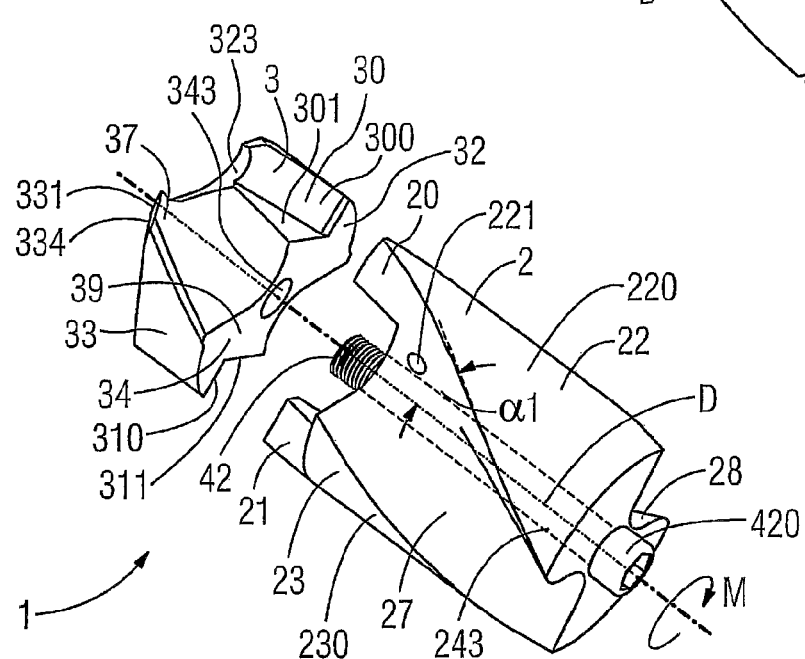

US 8,992,143 B2

MODULAR DRILL

CROSS-REFERENCE TO RELATED APPLICATIONS

This application claim is a 371 national stage application of a 371 of international application No. PCT/EP2010/053485, filed on Mar. 17, 2010, and claims the benefit of and priority to German Patent Application No. 10 2009 013 580.4, filed Mar. 19, 2009, the contents of each of which are hereby incorporated by reference in their entirety.

BACKGROUND OF THE INVENTION

1. Field of the Invention

The invention relates to a modular drill, comprising a shank part with an end side, and a cutting part which is connected or can be connected to the shank part at its end side.

2. Background and Relevant Art

Drills, in particular made from solid carbide, have previously been configured in one piece as a rule. On account of the steeply rising raw material prices, in particular for carbide, manufacturers are changing, however, to manufacture and market modular tools.

Modular drills comprise firstly a shank part and secondly a cutting part, the shank part and the cutting part being connected or being capable of being connected to one another at a dividing point. In modular drills, the torque which is exerted on the shank part in order to make the drilling operation possible has to be transmitted to the cutting part.

In modular drills, only the cutting part is usually or at least frequently formed from solid carbide, and in contrast the shank part is formed from hardened steel.

Modular drills are known from JP 2005 16 14 62, DE 696 29 943 T2, WO 03/070408, DE 44 35 857 A1 and DE 698 25 586 T2.

BRIEF SUMMARY OF THE INVENTION

It is firstly an object of the invention to provide a new dividing point for a modular drill. It is additionally an object of the invention to provide a modular drill which has as satisfactory a possibility for transmitting the torque as possible and additionally can be operated as inexpensively as possible.

The objects are achieved by a modular drill as claimed in claim 1 of the invention, advantageous embodiments and developments resulting, in particular, from the subclaims.

In accordance with claim 1, the invention relates to a modular drill, comprising a) a shank part with an end side, a1) the shank part being rotatable in a rotational direction about a rotational axis, b) a cutting part which is rotatable about a or the rotational axis, and which is connected or can be connected to the shank part at its end side, c) the shank part having at least one torque transmission element which projects on the end side, c1) the at least one torque transmission element having at least one torque transmission face for transmitting a torque in the rotational direction from the shank part to the cutting part, d) the cutting part having at least one torque receiving region for receiving the torque, d1) the at least one torque receiving region having at least one torque receiving face which corresponds with the torque transmission face, e) the cutting part having at least one centering element for radially centering the cutting part in relation to the shank part, f) the cutting part being clamped or being capable of being clamped to the shank part via a clamping element which acts at least predominantly in the axial direction.

With the aid of the modular drill according to the invention, a dividing point is therefore produced between the shank part and the cutting part, by way of which dividing point torques can be transmitted advantageously from the shank part to the cutting part. In addition, the modular drill according to the invention permits radial centering and clamping of the cutting part in relation to the shank part.

The modular drill according to the invention makes a material saving possible, since usually the entire drill no longer has to be replaced as a result of wear, but rather only the cutting part. If only the cutting part is replaced, regrinding of the drill which is customary in non-modular drills is also dispensed with, which regrinding usually takes place at the drill manufacturer and also causes additional costs for shipping, with the result that the logistics costs for the provision of the drill are also reduced further by the modular drill according to the invention.

The shank part preferably has, on its end side, a dividing face which extends at least substantially perpendicularly with respect to the rotational axis and/or the cutting part has, on its base side which is remote from the end side, a dividing face which extends at least substantially perpendicularly with respect to the rotational axis, the dividing face of the shank part and the dividing face of the cutting part particularly preferably adjoining one another or being capable of adjoining one another flatly, in particular in contact with one another. This increases the stability of the connection of cutting part and shank part in an additional way.

The shank part preferably has exactly or at least two drill bodies extending parallel to the rotational axis or helically around the rotational axis at a helix angle, which drill bodies are separated from one another by flutes, the or in each case one torque transmission element particularly preferably being formed at the end-side end of a or each drill body or forming the end-side end. Torques can be transmitted in a particularly advantageous way via the end-side end.

The cutting part preferably has at least two drill bodies extending parallel to the rotational axis or helically around the rotational axis at a helix angle, which drill bodies are separated from one another by flutes, the or each drill body forming a cutting edge at its end-side edge which is arranged in the rotational direction, a cutting edge corner being formed at the outer end of the or each cutting edge.

In one preferred embodiment, the or each drill body has a drill body end face at its end-side end, which drill body end face is particularly preferably adjoined in the opposite rotational direction by a drill body intermediate face which forms a transition to the or to a flute. As a result, firstly the stability of the edge can be increased and secondly the discharging of the accumulating chips can be improved.

The or in each case one torque receiving element preferably extends from the dividing face to the drill body intermediate face and/or to the drill body end face and adjoins the drill body intermediate face and/or the drill body end face. In this way, the torque receiving element and optionally the torque transmission element can be of particularly large configuration, as a result of which the torque can be transmitted in a particularly effective way.

As an alternative or in addition, the torque receiving region extends parallel to the rotational axis in the direction of the drill body end face and/or of the drill body intermediate face or has an inclination counter to the rotational direction. This makes particularly simple mounting of the cutting part on the shank part possible, since the cutting part can be attached to the shank part without a rotation of the cutting part in relation to the shank part being required as they approach one another.

The torque transmission element preferably has at least one centering face for radially centering the cutting part in relation to the shank part, the at least one torque receiving region having a mating centering face which corresponds with the centering face, the at least one centering face forming, together with the mating centering face, a centering element. A centering face on the torque transmission element makes particularly efficient production of cutting and shank parts possible, since the torque transmission element can act at the same time as a centering element in this case.

In one preferred embodiment, a pin is arranged on the cutting part along the rotational axis, a central hole being arranged on the shank part along the rotational axis.

The pin preferably engages into the central hole or can engage into the latter and/or forms a centering element for radially centering and/or stabilizing the cutting part in relation to the shank part. A pin along the rotational axis as centering element makes simple production possible, since said pin can be produced in a centered manner and in a simple way during rotation of the cutting part around its rotational axis.

The drill preferably has a drill diameter on the cutting part, the clamping element having holes (or: through holes) for fastening screws in the cutting part, the shank part having threaded holes (or: holes which have a thread), preferably as a continuation of the holes in the cutting part, for fastening screws, the fastening screws having a diameter of between 10% and 30%, preferably of approximately 15%, of the drill diameter. Fastening screws on the cutting part can be used in a simple way for clamping, and in addition the clamping force can be metered in a simple way by fixing of the torque to be used during tightening of the fastening screws.

In one preferred embodiment, the cutting part has a drill diameter, the cutting part having two drill bodies, a first plane
  a) being remote from the rotational axis by from 40% to 70%, preferably by approximately 60%, of half the drill diameter,
  b) being parallel to the rotational axis, and
  c) being rotated by from 50° to 85°, preferably by 68°, with respect to a second plane through the shank-side cutting edge corners of the two drill bodies, in which second plane the rotational axis preferably extends,
  d) the center axis for the screw holes for the fastening screws extending on the first plane, in particular at an angle in relation to a line which is parallel to the rotational axis, preferably of from approximately 30% to 80%, particularly preferably of from approximately 40% to 60%, of the helix angle.

This arrangement of the center axes can firstly be set simply to a predefined helix angle, and secondly the two screw connections make a particularly stable connection possible as a result of their relative angle with respect to one another.

The drill preferably has a drill diameter, the cutting part having two drill bodies, the center axis for a or each screw hole for the fastening screws extending in each case on a first plane and on a third plane, the first plane
  a) extending at an angle of from 50° to 85°, preferably of approximately 68°, with respect to a second plane through the shank-side cutting edge corners and at least substantially through the rotational axis, and
  b) extending at least substantially parallel to the rotational axis, the spacing of the first plane from the rotational axis being from 40% to 70%, preferably approximately 60%, of half the drill diameter, and
the third plane being at an angle of approximately 90° with respect to the first plane and/or being inclined by from approximately 40% to 60% of the helix angle.

The clamping element on the cutting part preferably has, along the rotational axis, a threaded hole for a fastening screw, the shank part having, along the rotational axis, a through hole for the fastening screw. In this embodiment, effective clamping of cutting part and shank part which can be metered satisfactorily can be achieved merely with a single screw, which clamping additionally exerts a direct axial force on the cutting part and, moreover, does not have to impair the end face of the cutting part.

The clamping element preferably comprises a fastening screw which is screwed or can be screwed laterally at an angle into the shank part, the fastening screw engaging or being capable of engaging laterally at an angle into the pin, the pin having a recess for the engagement. This connection of cutting part and shank part which can also be called a whistle notch can likewise be metered satisfactorily, does not have to impair the end face of the drill and additionally can be set and/or fixed even when the drill is clamped.

At least one or in each case one cooling channel hole preferably extends within at least one or each drill body, it preferably but not necessarily being possible for the at least one cooling channel hole to extend so as to correspond with the course of the drill body in relation to the rotational axis, and it being possible, in particular, for it to extend parallel to or helically around the rotational axis, and/or the at least one cooling channel hole exiting in at least one flute of the shank part. This makes the feed of coolant possible without impairment of the cutting part and/or without the requirement for holes for the feed of coolant on the cutting part.

In one preferred embodiment, the torque transmission face and/or the torque receiving face are/is of straight, convex or concave configuration, and/or the torque transmission face and/or the torque receiving face extends/extend at a positive or negative angle of between 5° and 35°, preferably between 15° and 30°, particularly preferably of at least approximately 20°, with respect to the rotational axis.

The drill preferably has a drill diameter, the torque receiving face extending at an angle with respect to the dividing face, and/or a first transition region extending between a first torque receiving face and the dividing face and a second transition region extending between a second torque receiving face and the dividing face, the longitudinal edges of the first transition region extending at least approximately parallel to the longitudinal edges of the second transition region, and/or the longitudinal edges of the first transition region being at a spacing of from approximately 40 to 60%, preferably of approximately 50%, of half the drill diameter from the longitudinal edges of the second transition region, measured perpendicularly with respect to the course direction of the longitudinal edges.

The centering face and/or the mating centering face are/is preferably of flat or curved configuration, in particular as part of a cylinder shell face with the rotational axis as center axis. A centering face which is configured as part of a cylinder shell face with the rotational axis as center axis can likewise be produced in a particularly effective way, whereby the drill can also be operated at least comparatively inexpensively.

The or each torque transmission element preferably comprises an end face at its end-side end, the following adjoining the end face in the counterclockwise direction:

a) at least one outer face which merges at the other end into an outer face of the drill body, b) the torque transmission face which adjoins the dividing face at the other end, c) the or a centering face which adjoins the dividing face at the other end, and d) a mating torque transmission face which merges at the other end into a flute.

The torque receiving face preferably adjoins the mating centering face at an angle, the angle being approximately 90°, the torque transmission face particularly preferably or as an alternative adjoining the centering face at an angle, the angle being approximately 90°. These variants make particularly satisfactory centering of the cutting part possible in relation to the shank part with simultaneously satisfactory torque transmission.

BRIEF DESCRIPTION OF THE DRAWINGS

In the following text, the invention will be explained further using exemplary embodiments and with reference to the appended drawings, in which:

FIGS. 1 and 2 show exemplary embodiments for modular drills according to the invention.

DETAILED DESCRIPTION OF THE PREFERRED EMBODIMENTS

Figure 3:
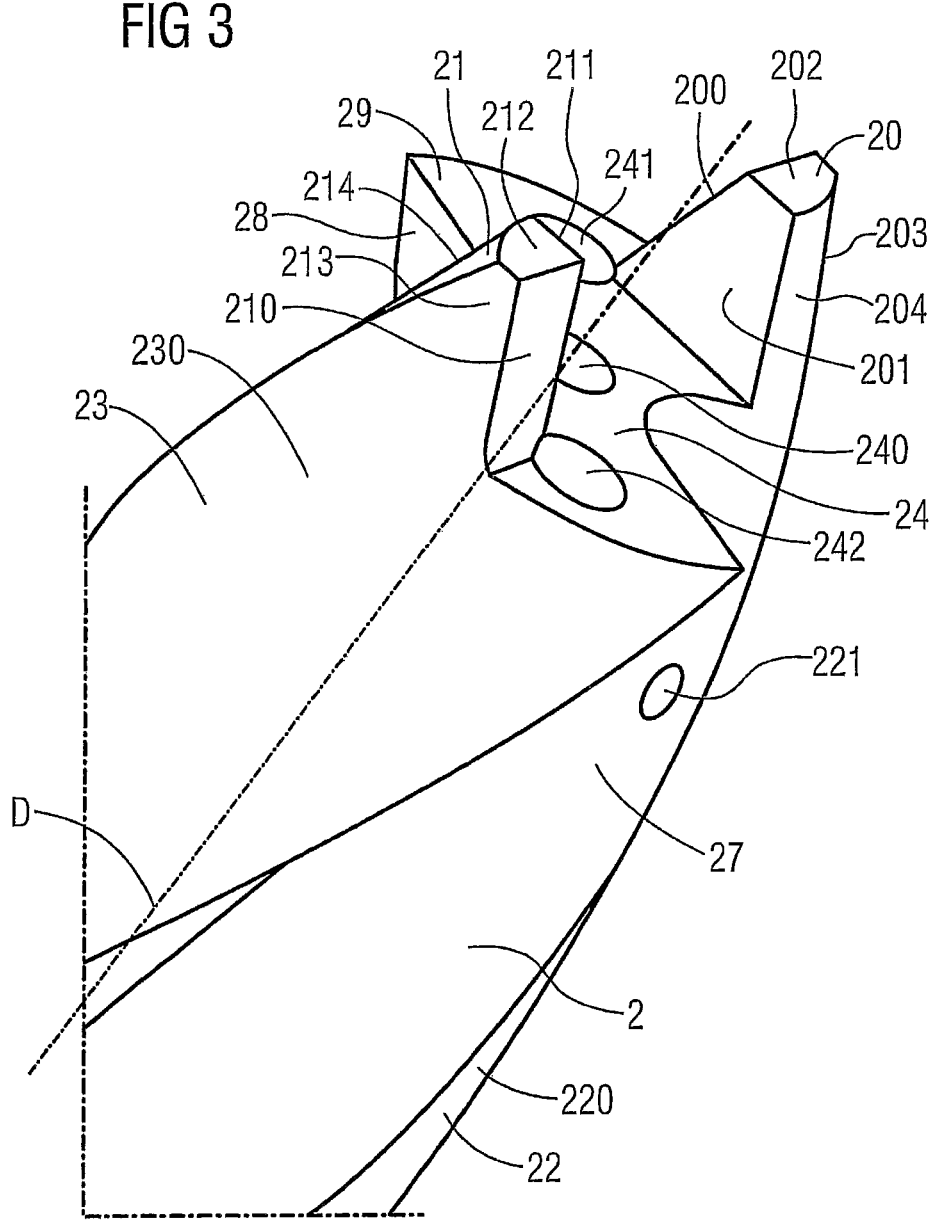
FIG. 3 shows one exemplary embodiment for a shank part according to the invention.

The modular drills 1 according to FIGS. 1 and 2 in each case comprise a shank part 2 and a cutting part 3 (or drill head) which can be connected to the shank part, which shank part 2 and cutting part 3 can be rotated in each case in a rotational direction about the rotational axis D. The base side 39 of the cutting part 3, which base side 39 is remote from the end side, can be connected to the shank part 2 at the end side 29 of the latter.

For machine-side receiving, the shank part 2 has a shank which can be configured in a manner known per se, for example in cylindrical form, and is not shown in the figures.

The shank part 2 has two drill bodies 22 and 23 which extend helically around the rotational axis D at a helix angle ☐1. As an alternative, the drill bodies could also extend in the axial direction, parallel to the rotational axis D. A greater number of drill bodies is likewise possible.

The drill bodies 22 and 23 of the shank part 2 are separated from one another in each case by flutes 27 and 28.

The cutting part 3 accordingly has two drill bodies 32 and 33 which extend helically around the rotational axis D, likewise at a helix angle ☐1. As an alternative, in particular if this is the case in the shank part 2, the drill bodies 32 and 33 could also extend in the axial direction, parallel to the rotational axis D. A greater number of drill bodies is likewise accordingly possible.

The drill bodies 32 and 33 of the cutting part 3 are also separated from one another in each case by flutes 37 and 38. The cutting part 3 has a dividing face 34 at its end which faces the shank part 2.

Figure 6:
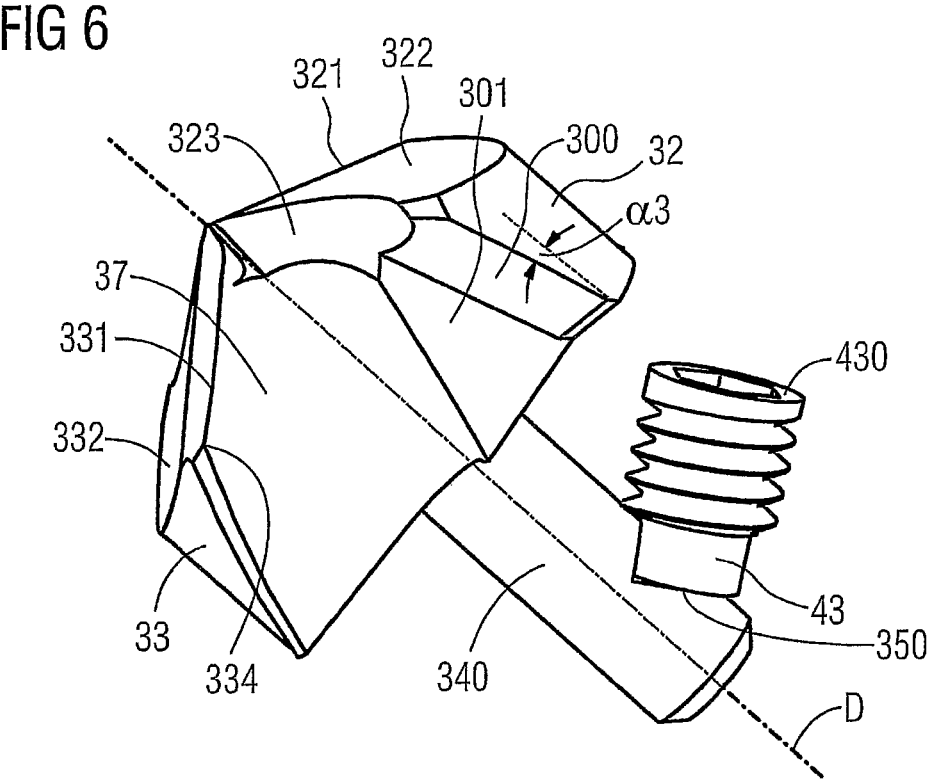

As can be seen, for example, from FIG. 6, the drill body 32 has a drill body end face 322 at its end-side end, which drill body end face 322 is adjoined in the opposite rotational direction by a drill body intermediate face 323 which forms a transition to the flute 37.

At its end-side end, which can be seen only partially in FIG. 6, the drill body 33 has a drill body end face 332 which is adjoined in the opposite rotational direction by a drill body intermediate face 333 which forms a transition to the flute 38.

Figure 5:
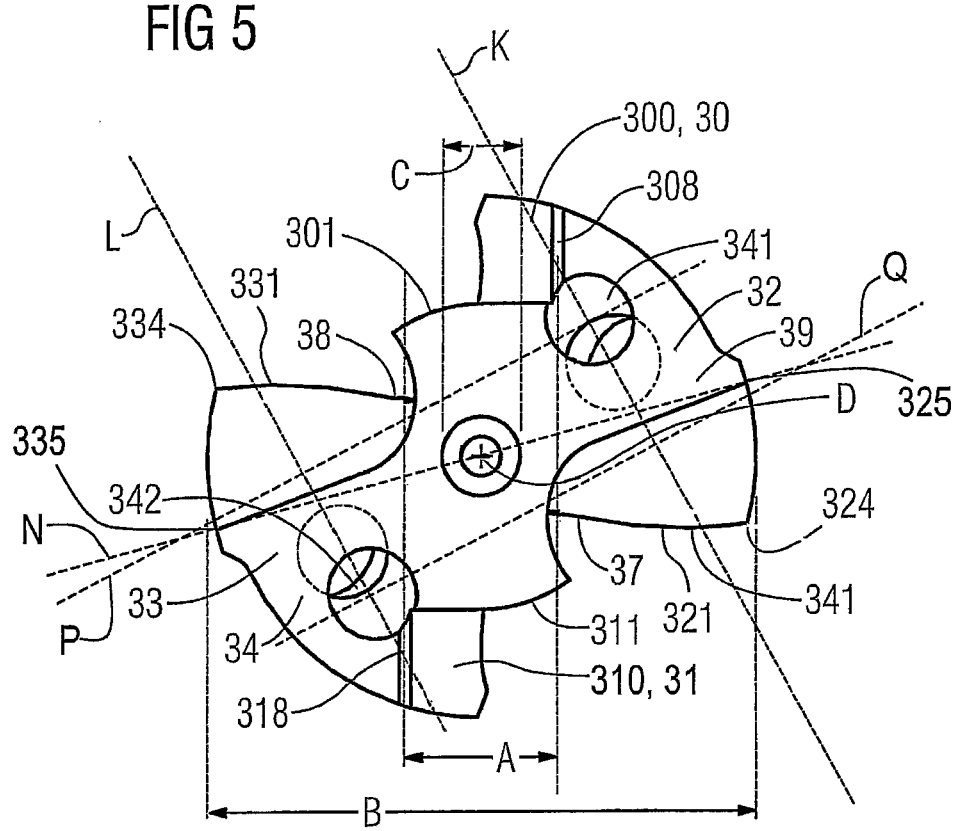

As can be seen, in particular, from FIG. 5, the drill body 32 of the cutting part 3 forms a cutting edge 321 at its end-side edge which is arranged in the rotational direction, an end-side cutting edge corner 324 being formed at the outer end of the cutting edge. The cutting edge continues in the direction of the shank part 2 as far as the dividing face 34, at which the cutting edge forms a shank-side cutting edge corner 325.

Accordingly, the drill body 33 forms a cutting edge 331 at its end-side edge which is arranged in the rotational direction, an end-side cutting edge corner 334 being formed once again at the outer end of the cutting edge 331. The cutting edge continues in the direction of the shank part 2 as far as the dividing face 34, at which the cutting edge forms a shank-side cutting edge corner 335.

Figure 7:
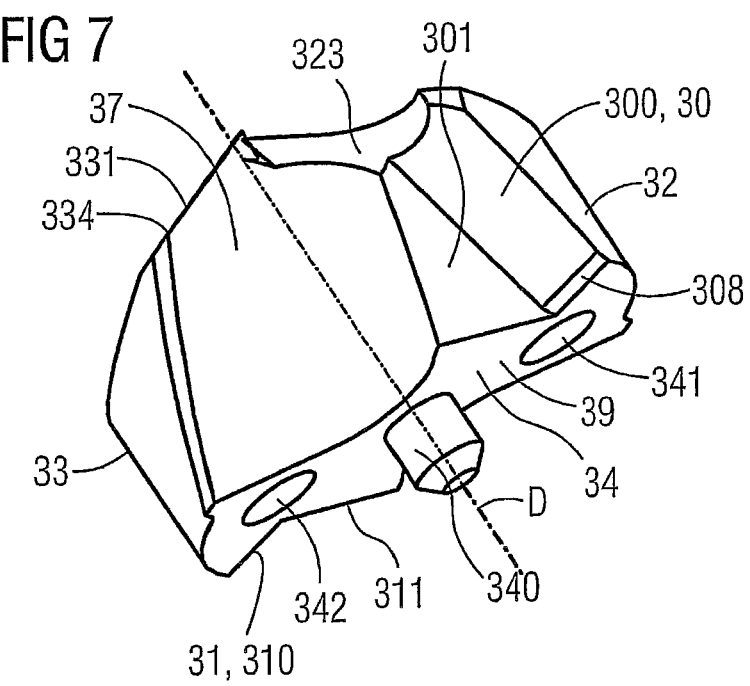

As can be seen, for example, from FIG. 7, the torque receiving element 30 extends from the dividing face 34 to the drill body intermediate face 323 and adjoins the drill body intermediate face 323.

In the direction of the drill body intermediate face 323, the torque receiving region 30 has an inclination counter to the rotational direction, but it can also extend parallel to the rotational axis D.

The torque receiving element 31 correspondingly extends from the dividing face 34 to the drill body intermediate face 333 and adjoins the drill body intermediate face 333.

Like the torque receiving region 30, the torque receiving region 31 has an inclination in the direction of the drill body intermediate face 333 counter to the rotational direction, but it can also extend parallel to the rotational axis D.

As can also be seen from FIG. 3, the shank part 2 has a dividing face 24 on its end side 29, which dividing face 24 extends perpendicularly with respect to the rotational axis D, and, at the outer edges of the dividing face 24, two torque transmission elements 20 and 21 which project on the end side.

On an end side, the torque transmission element 20 has an end face 202 which is adjoined, in each case at least approximately at right angles, on the outer side by an outer face 203 and, in the viewing direction of the shank part 2 in the counterclockwise direction, by a torque transmission face 200, an inwardly directed centering face 201 and a mating torque transmission face 204.

At its end which is remote from the end side 202, the outer face 203 merges smoothly into the outer face 220 of the drill body 22 and has a curvature which is at least approximately like the outer face 220 of the drill body 22.

The torque transmission face 200 and the centering face 201 are of flat or curved configuration and, at their end which is remote from the end side 202, in each case merge approximately at right angles or at another angle into the dividing face (or connecting face) 24.

At its end which is remote from the end side 202, the mating torque transmission face 204 merges smoothly into the flute 27.

In a corresponding way, the torque transmission element 21 has, on its end side, an end face 212 which is adjoined, in each case at least approximately at right angles, on the outer side by an outer face 213 and, in the viewing direction of the shank part 2 in the counterclockwise direction, a torque transmission face 210, an inwardly directed centering face 211 and a mating torque transmission face 214.

At its end which is remote from the end side 212, the outer face 213 merges smoothly into the outer face 230 of the drill body 23 and has a curvature which is at least approximately like the outer face 230 of the drill body 23.

The torque transmission face 210 and the centering face 211 are of flat or curved configuration and, at their end which is remote from the end side 212, merge in each case approximately at right angles or at another angle into the dividing face (or connecting face) 24.

At its end which is remote from the end side 202, the mating torque transmission face 214 merges smoothly into the flute 28.

In a corresponding manner to the dividing face (or: connecting face) 24, the cutting part 3 forms a dividing face (or: connecting face) 34 which likewise extends perpendicularly with respect to the rotational axis D.

In a corresponding way to the torque transmission element 20, a torque receiving region 30 is formed on the cutting part 3, which torque receiving region 30 has a torque receiving face 300 which can bear flatly against the torque transmission face 200 and a mating centering face 301 which can bear flatly against centering face 201. This can be seen from FIG. 2 and from FIGS. 4 to 8, FIG. 3 and FIG. 7 showing embodiments which can be combined with one another. To this extent, the torque receiving face 300 corresponds with the torque transmission face 200 and the mating centering face 301 corresponds with the centering face 201. The mating centering face 301 and the torque receiving face 300 are at an angle of approximately 90° with respect to one another.

In a corresponding way to the torque transmission element 21, furthermore, a torque receiving region 31 is formed on the cutting part 3, which torque receiving region 31 has a torque receiving face 310 and a mating centering face 311. This can likewise be seen from FIG. 2 and partially from FIGS. 4 to 8. Here, the torque receiving face 310 corresponds with the torque transmission face 210 and the mating centering face 311 corresponds with the centering face 211. The mating centering face 311 and the torque receiving face 310 are also at an angle of approximately 90° with respect to one another.

Furthermore, a central pin 340 is arranged as centering pin on the cutting part 3 according to FIGS. 1, 4, 6, 7 and 8, which centering pin extends from the center of the dividing face 34 in the direction of the shank part 2. In a corresponding way, a central hole 240 is made in the shank part 2, into which central hole 240 the pin 340 engages circularly and thus likewise centers the cutting part 3 in relation to the shank part 2.

As an alternative, FIG. 2 shows a screw 42 which is introduced into a corresponding through hole 243 which is arranged centrally within the shank part 2. The screw 42 extends with its first end on the end side in the direction of the cutting part 3 and crosses the shank part 2 along its rotational axis D, the opposite second end having a hexagon socket 420 for adjusting the screw 42.

In a corresponding way, the cutting part 3 comprises a threaded hole 343 which has a thread, into which the screw 42 can engage.

FIG. 6 shows a threaded pin 43 with an external thread 430, which threaded pin 43 can be screwed laterally at an angle by way of a suitable threaded hole (not shown) which is directed away from the end side through the shank part as far as a recess 350 in the pin 340 of the cutting part 3, which recess 350 is arranged within the shank part, whereby the pin 340 and therefore the cutting part 3 can be fixed on the shank part (whistle notch).

In contrast, FIG. 1 shows two screws 40 and 41 which engage at an angle into a hole 341 and a hole 342 of the cutting part 3, two threaded holes 241 and 242 being made additionally on the shank part 2, into which threaded holes 241 and 242 the screws 40 and 41 can engage.

Coolant channels 221 and 231 which extend helically or else in a straight line in a manner known per se and of which, however, only the outlet opening of the coolant channel 221 can be seen in the FIG can be formed within the drill bodies 22 and 23 of the shank part 2.

Figure 4:
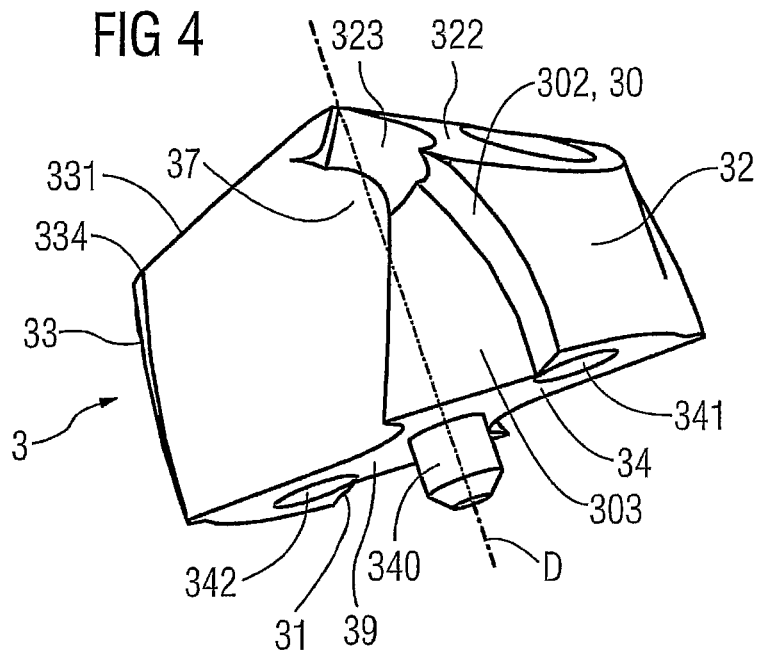
FIGS. 4 to 8 show exemplary embodiments for cutting parts according to the invention.

FIG. 4 shows a further embodiment of the cutting part 3 according to the invention with torque receiving face 302 and mating centering face 303. The torque receiving face 302 has a curvature counter to the rotational direction.

Figure 8:
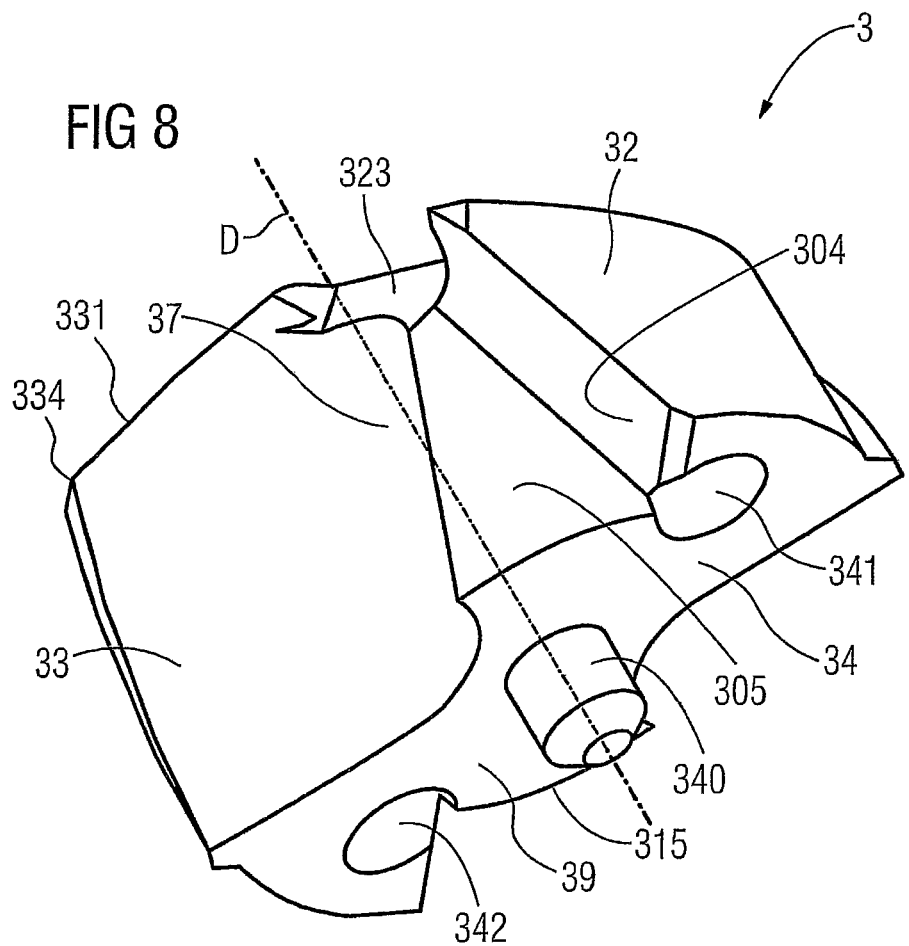

FIG. 8 shows a further embodiment of a cutting part 3 according to the invention with a straight, non-curved torque receiving face 304 and a mating centering face 305. The mating centering face 305 has a radial curvature. The associated torque transmission element (not shown) of the shank part 2 is shaped in a corresponding way.

In order to operate the modular drill 1, to this extent the cutting part 3 is fastened to the shank part 2 by screws 40 and 41 and/or a screw 42 and/or the pin 340, which brings about fixing in the axial direction and, in particular as a result of the pin 340, in the radial direction.

Furthermore, the cutting part 3 can be fixed in the radial direction with respect to the shank part 2 by the centering faces 201, 211 and can transmit the required torque M via the torque transmission faces 200, 210.

Together with the centering face 211 in correspondence with the mating centering face 311, the centering face 201 in correspondence with the mating centering face 301 brings about radial centering of the cutting part 3 in relation to the shank part 2.

To this extent, the torque transmission elements 20 and 21 make both radial centering of the cutting part 3 in relation to the shank part 2 and a satisfactory transmission of the torque from the cutting part 3 to the shank part 2 possible.

The angle □3 (which can be seen in FIG. 6) of the torque receiving face 300 with respect to the drill axis D is preferably approximately 20° in the opposite rotational direction.

A first transition region 308 is arranged, in each case at an angle, between the first torque receiving face 300 and the dividing face 34, and a second transition region 318 extends between a second torque receiving face 310 and the dividing face 34. This can likewise be seen in FIG. 5.

The first transition region 308 extends parallel to the second transition region 318. The first transition region 308 has a spacing A from the second transition region 318 of approximately 50% of half the drill diameter B, as measured perpendicularly with respect to the course direction of the longitudinal edges of the transition regions 308 and 318.

As is shown in FIG. 1 and FIG. 5, the screws 40 and 41 are inclined in each case at an angle with respect to the rotational axis D. This represents one preferred embodiment of the invention. The inclined screws 40 and 41 make radial play-free mounting of the cutting part 3 possible, since the torque transmission faces and the corresponding mating torque transmission faces are clamped against one another.

In order to realize the angle of the screws 40 and 41 with respect to the rotational axis D, the center axes for the associated screw holes 341, 342 are positioned obliquely.

Here, the center axis for the screw hole 341 lies both on a first plane K and on a third plane P.

The first plane K is at an angle generally of between 50° and 85°, of approximately 68° for the concrete embodiment, with respect to a second plane N through the shank-side cutting edge corners 325, 335 and through the rotational axis, the spacing of the first plane K from the rotational axis D generally being between 40% and 70%, approximately 60% for the concrete embodiment, of half the drill diameter B. The plane K extends parallel to the rotational axis D.

The third plane P is at an angle of approximately 90° with respect to the first plane K and is inclined by from approximately 40% to 60% of the helix angle.

The center axis for the screw hole 342 lies both on a first plane L and on a third plane Q.

The first plane L is at an angle generally of between 50° and 85°, of approximately 68° for the concrete embodiment, with respect to the second plane N through the shank-side cutting edge corners 325, 335 and through the rotational axis, the spacing of the first plane L from the rotational axis D generally being between 40% and 70%, approximately 60% for the concrete embodiment, of half the drill diameter B. The plane L extends parallel to the rotational axis D.

The third plane Q is at an angle of approximately 90° with respect to the first plane L and is inclined by from approximately 40% to 60% of the helix angle.

To this end, FIG. 5 shows the first plane K and the plane L parallel thereto, which planes K, L are remote from the drill axis D generally by between 40% and 70%, approximately 60% in the concrete embodiment, of half the drill diameter, are parallel to said drill axis D, and are rotated here in each case generally by between 50° and 85°, by approximately 68° for the concrete embodiment, with respect to the second plane N through the shank-side cutting edge corners 325 and 335 and the rotational axis D. Furthermore, FIG. 5 shows a section through the planes P and Q, the plane P extending parallel to the center axis of the screw hole 341 in the direction of the end side of the cutting part 3, and the plane Q extending parallel to the center axis of the screw hole 342 in the direction of the end side.

The center axis of the screw hole 341 for the fastening screw 40 extends on the first plane K through the drill body 32 at an angle of approximately 60% of the helix angle □1 which is approximately 30° in relation to a line which is parallel to the rotational axis D.

The center axis of the screw hole 342 for the fastening screw 41 extends on the plane L through the drill body 34 at an angle of approximately 60% of the helix angle □1 in relation to a line which is parallel to the rotational axis D.

In the embodiment according to FIG. 1 and FIG. 5, the screw diameter S of the screws 40 and 41 is from 10% to 30%, preferably approximately 15%, of the diameter B of the drill 1.

Figure 9:
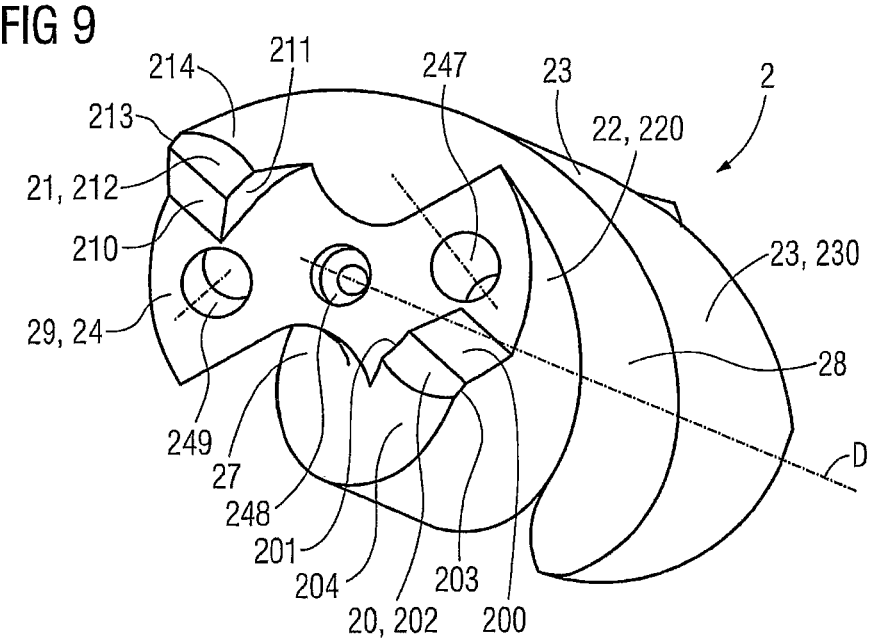
FIGS. 9 and 10 show exemplary embodiments for shank parts according to the invention.

FIG. 9 shows a further shank part 2 which corresponds with the cutting part 3 according to FIG. 8.

The shank part 2 once again has a dividing face 24 on its end side 29, which dividing face 24 extends perpendicularly with respect to the rotational axis D, and two torque transmission elements 20 and 21 which project on the end side at the outer edges of the dividing face 24.

On its end side, the torque transmission element 20 has an end face 202 which is adjoined, in each case at least approximately at right angles, on the outside by an outer face 203 and, in the viewing direction of the shank part 2 in the counterclockwise direction, a torque transmission face 200, an inwardly directed centering face 201 and a mating torque transmission face 204.

At its end which is remote from the end side 202, the outer face 203 merges smoothly into the outer face 220 of the drill body 22 and has a curvature which is at least approximately like the outer face 220 of the drill body 22.

The torque transmission face 200 according to FIG. 9 is of flat configuration and, at its end which is remote from the end side 202, merges at an angle of approximately 110° into the dividing face (or connecting face) 24, another angle also being possible.

In a corresponding manner to the face 305 of the cutting part 3 according to FIG. 8, the centering face 201 according to FIG. 9 is of tangentially curved configuration and, at its end which is remote from the end side 202, merges approximately at a right angle into the dividing face (or connecting face) 24, another angle also being possible in correspondence with the face 305 according to FIG. 8.

At its end which is remote from the end side 202, the mating torque transmission face 204 according to FIG. 9 merges smoothly into the flute 27.

In a corresponding way, the torque transmission element 21 has an end face 212 on its end side, which end face 212 is adjoined, in each case at least approximately at right angles, on the outer side by an outer face 213 and, in the viewing direction of the shank part 2 in the counterclockwise direction, a torque transmission face 210, an inwardly directed centering face 211 and a mating torque transmission face 214.

At its end which is remote from the end side 212, the outer face 213 merges smoothly into the outer face 230 of the drill body 23 and has a curvature which is at least approximately like the outer face 230 of the drill body 23.

The torque transmission face 210 is of flat configuration and, at its end which is remote from the end side 212, merges at an angle of approximately 110° into the dividing face (or connecting face) 24, another angle also being possible in correspondence with the corresponding face in the cutting part according to FIG. 8.

In a corresponding manner to the face 315 according to FIG. 8, the centering face 211 according to FIG. 9 is of tangentially curved configuration and, at its end which is remote from the end side 212, merges approximately at a right angle into the dividing face (or: connecting face) 24, another angle also being possible once again in a corresponding manner with the face 315.

At its end which is remote from the end side 212, the mating torque transmission face 214 according to FIG. 9 merges smoothly into the flute 28.

In a corresponding manner to the dividing face (or: connecting face) 24 according to FIG. 9, the cutting part 3 according to FIG. 8 forms a dividing face (or: connecting face) 34 which likewise extends perpendicularly with respect to the rotational axis D.

Furthermore, the cutting part 3 according to FIG. 9 can be fixed in the radial direction with respect to the shank part 2 by the centering faces 201, 211 and can transmit the required torque M via the torque transmission faces 200, 210.

Figure 11:
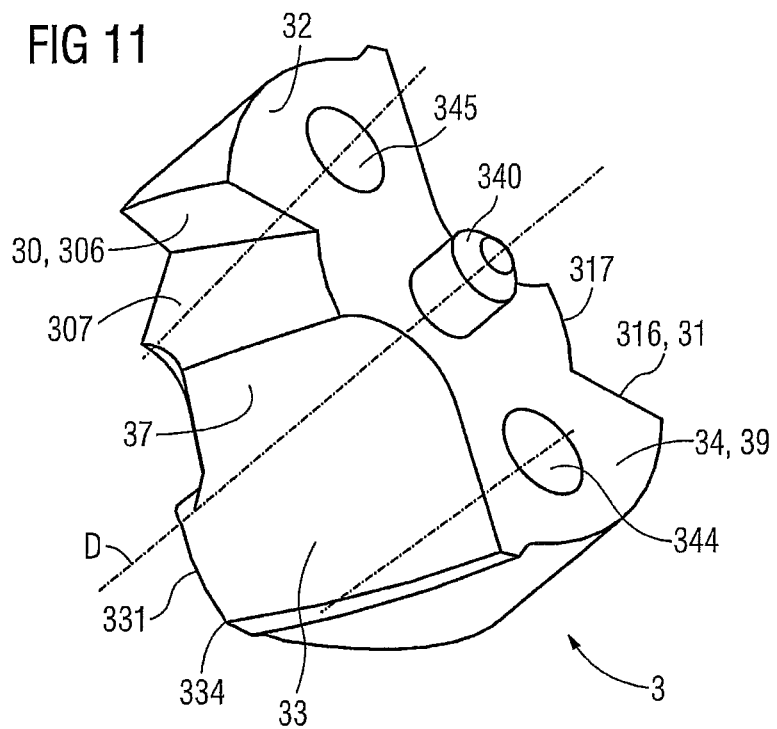
FIG. 11 shows one exemplary embodiment for a shank part according to the invention.
Figure 10:
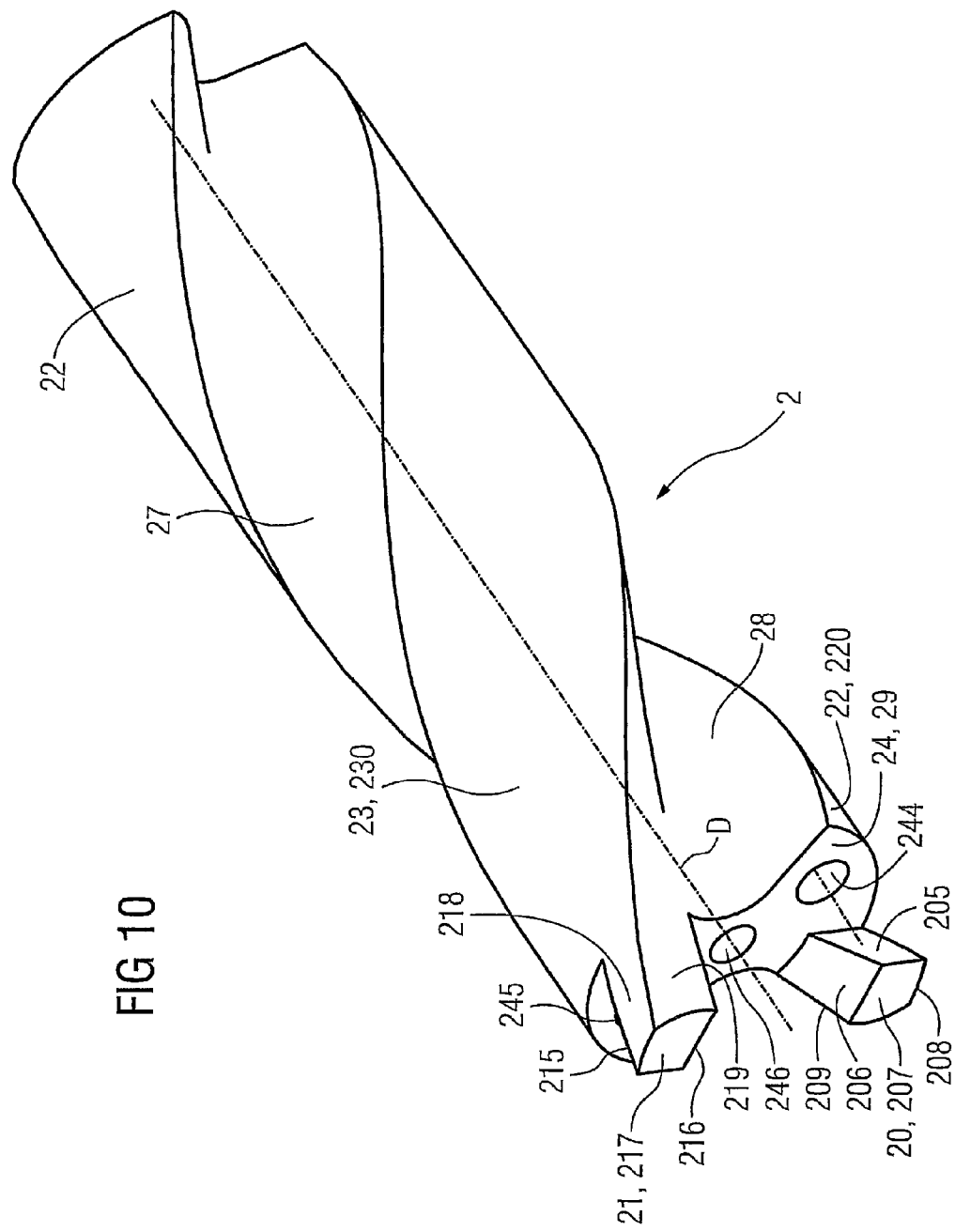

FIG. 10 shows a further shank part 2 which corresponds with the cutting part 3 according to FIG. 11.

On its end side 29, the shank part 2 according to FIG. 10 has a dividing face 24 which extends perpendicularly with respect to the rotational axis D, and two torque transmission elements 20 and 21 which project on the end side at the outer edges of the dividing face 24.

On its end side, the torque transmission element 20 has an end face 207 which is adjoined, in each case at least approximately at right angles, on the outside by an outer face 208 and, in the viewing direction of the shank part 2 in the counterclockwise direction, a torque transmission face 205, an inwardly directed centering face 206 and a mating torque transmission face 209.

At its end which is remote from the end side 207, the outer face 208 merges smoothly into the outer face 220 of the drill body 22 and has a curvature which is at least approximately like the outer face 220 of the drill body 22.

The torque transmission face 205 is of flat configuration and, at its end which is remote from the end side 207, merges at an angle of approximately 60° into the dividing face (or: connecting face) 24, another angle also being possible in correspondence with the corresponding face on the cutting part 3 according to FIG. 11.

The centering face 206 according to FIG. 10 is of curved configuration and, at its end which is remote from the end side 207, merges approximately at a right angle into the dividing face (or: connecting face) 24, another angle also being possible in correspondence with the corresponding face on the cutting part 3 according to FIG. 11.

At its end which is remote from the end side 207, the mating torque transmission face 209 according to FIG. 10 merges smoothly into the flute 27.

In a corresponding way, the torque transmission element 21 has an end face 217 on its end side, which end face 217, in each case at least approximately at right angles, is adjoined on the outside by an outer face 218 and, in the viewing direction of the shank part 2 in the counterclockwise direction, a torque transmission face 215, an inwardly directed centering face 216 and a mating torque transmission face 219.

At its end which is remote from the end side 217, the outer face 218 merges smoothly into the outer face 230 of the drill body 23 and has a tangential curvature which is at least approximately like the outer face 230 of the drill body 23.

The torque transmission face 215 according to FIG. 10 is of flat configuration and, at its end which is remote from the end side 217, merges at an angle of approximately 60° into the dividing face (or: connecting face) 24, another angle also being possible according to the associated face according to FIG. 11.

The centering face 216 according to FIG. 10 is of curved configuration and, at its end which is remote from the end side 217, merges approximately at a right angle into the dividing face (or: connecting face) 24, another angle also being possible according to the associated face according to FIG. 11.

At its end which is remote from the end side 217, the mating torque transmission face 219 according to FIG. 10 merges smoothly into the flute 28.

In a corresponding manner to the dividing face (or: connecting face) 24 according to FIG. 10, the cutting part 3 according to FIG. 11 forms a dividing face (or: connecting face) 34 which likewise extends perpendicularly with respect to the rotational axis D.

FIG. 11 shows a cutting part 3 which belongs to the shank part 2 according to FIG. 10.

In a corresponding way to the torque transmission element 20 according to FIG. 10, a torque receiving region 30 is formed on the cutting part 3 according to FIG. 11, which torque receiving region 30 has a torque receiving face 306 which can bear flatly against the torque transmission face 205 and a mating centering face 307 which can bear flatly against centering face 206.

To this extent, the torque receiving face 306 according to FIG. 11 corresponds with the torque transmission face 205 according to FIG. 10, and the mating centering face 307 corresponds with the centering face 206. The mating centering face 307 and the torque receiving face 306 are at an angle of approximately 90° with respect to one another.

The angle of the torque receiving face 306 with respect to the drill axis D is preferably approximately 30° in the rotational direction.

Furthermore, in a corresponding way to the torque transmission element 21 according to FIG. 10, a torque receiving region 31 which has a torque receiving face 316 and a mating centering face 317 is formed on the cutting part 3 according to FIG. 11.

Here, the torque receiving face 316 according to FIG. 11 corresponds with the torque transmission face 215 according to FIG. 10, and the mating centering face 317 corresponds with the centering face 216. The mating centering face 317 and the torque receiving face 316 are also at an angle of approximately 90° with respect to one another.

LIST OF DESIGNATIONS

1 Drill
2 Shank part
20, 21 Torque transmission element
200, 210 Torque transmission faces
201, 211 Centering faces
202, 212 End faces
203, 213 Outer faces
204, 214 Mating torque transmission faces
22, 23 Drill body
220, 230 Outer faces of the drill body
221, 231 Cooling channel holes
24 Dividing face
240 Central hole
241, 242 Threaded holes
243 Through hole
27, 28 Flutes
29 End side
3 Cutting part
30, 31 Torque receiving regions
300, 302, 304, 310 Torque receiving faces
301, 303, 305, 311 Mating centering face
308, 318 Transition region
32, 33 Drill body
320, 330 Outer faces of the drill body
321, 331 Cutting edges
322, 332 Drill body end face
323, 333 Drill body intermediate face
324, 334 End-side cutting edge corners
325, 335 Shank-side cutting edge corners
34 Dividing face
340 Pin
341, 342, 343 Holes
350 Recess
37, 38 Flutes
39 Base side
40, 41, 42 Screws
420 Hexagon socket
43 Threaded pin
A, C, S Spacings
B Drill diameter
D Rotational axis
K, L, N, P, Q Planes
M Torque
☐1☐ Helix angle
☐2☐ Rotation angle
☐3 Inclination angle

We claim:

1. A modular drill, comprising
a) a shank part with an end side,
 a1) the shank part being rotatable in a rotational direction about a rotational axis,
 a2) the shank part having at least two drill bodies extending parallel to the rotational axis or helically around the rotational axis at a helix angle, which drill bodies are separated from one another by flutes, a3) the shank part having, on its end side, a dividing face which extends at least substantially perpendicularly with respect to the rotational axis,
b) a cutting part,
  b1) which is rotatable about a rotational axis, and which is connected or can be connected to the shank part at its end side,
  b2) the cutting part having a drill diameter and at least two drill bodies extending helically around the rotational axis at a helix angle of approximately 30°, which drill bodies are separated from one another by flutes,
  b3) the cutting part having, on its base side which is remote from the end side, a dividing face which extends at least substantially perpendicularly with respect to the rotational axis,
c) the shank part having at least one torque transmission element which projects on the end side, the at least one torque transmission element having at least one torque transmission face for transmitting a torque in the rotational direction from the shank part to the cutting part,
  c1) the torque transmission element forming the end-side end of a drill body,
  c2) the torque transmission element comprising an end face at its end-side end,
  c3) the following faces adjoining the end face in the counter-clockwise direction:
    c31) at least one outer face which merges at an other end opposite the end face into an outer face of the drill body,
    c32) the torque transmission face which adjoins the dividing face at the other end,
    c33) a centering face which adjoins the dividing face at the other end, and
    c34) a mating torque transmission face which merges at the other end into a flute,
d) the cutting part having at least one torque receiving region for receiving the torque, the at least one torque receiving region having at least one torque receiving face which corresponds with the torque transmission face,
  d1) wherein each drill body of the cutting part has a drill body end face at its end-side end,
  d2) which drill body end face is adjoined in the opposite rotational direction by a drill body intermediate face which forms a transition to a flute,
  d3) the torque receiving region extending from the dividing face to the drill body intermediate face and to the drill body end face and adjoining the drill body intermediate face and the drill body end face,
  d4) the torque receiving region having an inclination against the rotational direction,
e) the cutting part having at least one centering element for radially centering the cutting part in relation to the shank part,
f) the cutting part being clamped or being capable of being clamped to the shank part via a clamping element which acts at least predominantly in the axial direction,
g) the clamping element
  g1) having, in the cutting part, holes or screw holes for fastening screws and having fastening screws,
  g2) the shank part having threaded holes for the fastening screws, as a continuation of the holes in the cutting part,
h) a pin being arranged on the cutting part along the rotational axis,
  i) a central hole arranged on the shank part along the rotational axis, and
  j) the pin engaging into the central hole and forming a centering element for radially centering and stabilizing the cutting part in relation to the shank part.

2. The modular drill as claimed in claim 1, the dividing face of the shank part and the dividing face of the cutting part adjoining one another or being capable of adjoining one another flatly and in contact with one another.

3. The modular drill as claimed in claim 2,
  a) the or each drill body forming a cutting edge at its end-side edge which is arranged in the rotational direction, and/or
  b) a cutting edge corner being formed at the or at each outer end of the or each cutting edge,
  c) an end-side cutting edge corner at the end side of the cutting part and/or a shank-side cutting edge corner at the dividing face of the cutting part.

4. The modular drill as claimed in claim 2, the central hole being a borehole.

5. The modular drill as claimed in claim 2, the pin engaging circularly into the shank part.

6. The modular drill as claimed in claim 2,
  a) the cutting part having a drill diameter,
  b) the cutting part having two drill bodies,
  c) at least one first plane
    c1) being remote from the rotational axis by from 40% to 70% of half the drill diameter,
    c2) being parallel to the rotational axis, and
    c3) being rotated by from 50° to 85° with respect to a second plane through shank-side cutting edge corners at the dividing face of the two drill bodies of the cutting part, in which second plane the rotational axis extends,
  d) the center axis for a or each screw hole for the fastening screws extending in each case on the first plane, in particular at an angle in relation to a line which is at least approximately parallel to the rotational axis, at an angle from approximately 30% to 80% of the helix angle.

7. The modular drill as claimed in claim 2,
  a) the drill having a drill diameter,
  b) the torque receiving face extending at an angle with respect to the dividing face,
  c) a first transition region extending between a first torque receiving face and the dividing face and a second transition region extending between a second torque receiving face and the dividing face, and
  d) the longitudinal edges of the first transition region extending at least approximately parallel to the longitudinal edges of the second transition region.

8. The modular drill as claimed in claim 1,
  a) the torque transmission element having at least one centering face for radially centering the cutting part in relation to the shank part,
  b) the at least one torque receiving region having a mating centering face which corresponds with the centering face,
  c) the at least one centering face forming, together with the mating centering face, the or a centering element.

9. The modular drill as claimed in claim 8, the centering face and/or the mating centering face being of flat or curved configuration, in particular being configured as part of a cylinder shell face with the rotational axis as center axis.

10. The modular drill as claimed in claim 8,
  a) the torque receiving face adjoining the mating centering face at an angle, the angle being approximately 90°, and/or b) the torque transmission face adjoining the centering face at an angle, the angle being approximately 90°.

11. The modular drill as claimed in claim 1,
a) the fastening screws having a diameter of between 10% and 30% of the drill diameter.

12. The modular drill as claimed in claim 1,
a) the cutting part having a drill diameter,
b) the cutting part having two drill bodies,
c) the center axis for a or each screw hole for the fastening screws extending in each case on a first plane and on a third plane,
   c1) the first plane
      c11) extending at an angle of from 50° to 85° with respect to a second plane through shank-side cutting edge corners at the dividing face of the cutting part and at least substantially through the rotational axis, and
      c12) extending at least substantially parallel to the rotational axis, the spacing of the first plane from the rotational axis being from 40% to 70% of half the drill diameter, and
   c2) the third plane being at an angle of approximately 90° with respect to the first plane and/or being inclined by from approximately 40% to 60% of the helix angle.

13. The modular drill as claimed in claim 1,
a) at least one or in each case one cooling channel hole extending within at least one or each drill body,
b) the at least one cooling channel hole extending so as to correspond with the course of the drill body in relation to the rotational axis, in particular parallel to or helically around the rotational axis, and/or
c) the at least one cooling channel hole exiting in at least one flute of the shank part.

14. The modular drill as claimed in claim 1,
a) the torque transmission face and/or the torque receiving face being of straight configuration.

15. The modular drill as claimed in claim 1,
a) the torque transmission face being of convex configuration, and
b) the torque receiving face being of concave configuration.

16. The modular drill as claimed in claim 1,
a) the torque transmission face and the torque receiving face extending at an angle of between 5° and 35° with respect to the rotational axis.

17. The modular drill as claimed in claim 1,
a) the torque transmission face and the torque receiving face extending at a positive angle of between 5° and 35° with respect to the rotational axis.

18. The modular drill as claimed in claim 9,
e) the longitudinal edges of the first transition region being at a spacing of from approximately 40 to 60% of half the drill diameter from the longitudinal edges of the second transition region, measured perpendicularly with respect to the course direction of the longitudinal edges.

* * * * *